United States Patent
Gebert et al.

(10) Patent No.: US 8,251,109 B2
(45) Date of Patent: Aug. 28, 2012

(54) FILLER NECK

(75) Inventors: Klaus Gebert, Willich (DE); Axel Wagner, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 476 days.

(21) Appl. No.: 12/538,368

(22) Filed: Aug. 10, 2009

(65) Prior Publication Data
US 2010/0193075 A1 Aug. 5, 2010

(30) Foreign Application Priority Data
Aug. 8, 2008 (DE) .................... 10 2008 036 979

(51) Int. Cl.
*B65B 1/04* (2006.01)
(52) U.S. Cl. .................. 141/286; 141/350; 220/86.2
(58) Field of Classification Search ............. 141/59, 141/286, 350; 220/86.2
See application file for complete search history.

(56) References Cited

U.S. PATENT DOCUMENTS

| | | | |
|---|---|---|---|
| 2,379,735 A | 7/1945 | Meikle | |
| 4,702,386 A | 10/1987 | Boehmer et al. | |
| 5,195,566 A * | 3/1993 | Ott et al. | 141/312 |
| 5,246,130 A | 9/1993 | Mondt et al. | |
| 5,431,199 A * | 7/1995 | Benjay et al. | 141/59 |
| 6,523,582 B2 * | 2/2003 | Furuta | 141/286 |
| 7,096,899 B2 * | 8/2006 | Vetter et al. | 141/350 |
| 7,415,997 B2 * | 8/2008 | Cisternino et al. | 141/368 |
| 7,640,954 B2 * | 1/2010 | Bar | 141/350 |
| 7,677,278 B2 * | 3/2010 | Pacitto et al. | 141/350 |

FOREIGN PATENT DOCUMENTS

| | | |
|---|---|---|
| DE | 3829948 | 3/1990 |
| DE | 19511073 | 9/1996 |
| DE | 19533306 | 12/1996 |
| EP | 0248673 | 12/1987 |

* cited by examiner

*Primary Examiner* — Timothy L Maust
(74) *Attorney, Agent, or Firm* — Grossman Tucker Perreault & Pfleger, PLLC

(57) ABSTRACT

The invention relates to a filler neck (1) for a fuel tank of a motor vehicle which has at least one tubular section (3) provided in the area of the filler inlet to receive the outlet pipe (4) of a fuel delivery nozzle. The filler neck (1) according to the invention has the distinguishing feature of at least one insert forming a constriction as a flame barrier, which encloses the outlet pipe (4), forming at least one gas passage gap (7), the gap dimension being selected so that any flashback is prevented.

14 Claims, 3 Drawing Sheets

FILLER NECK

Figure 1:
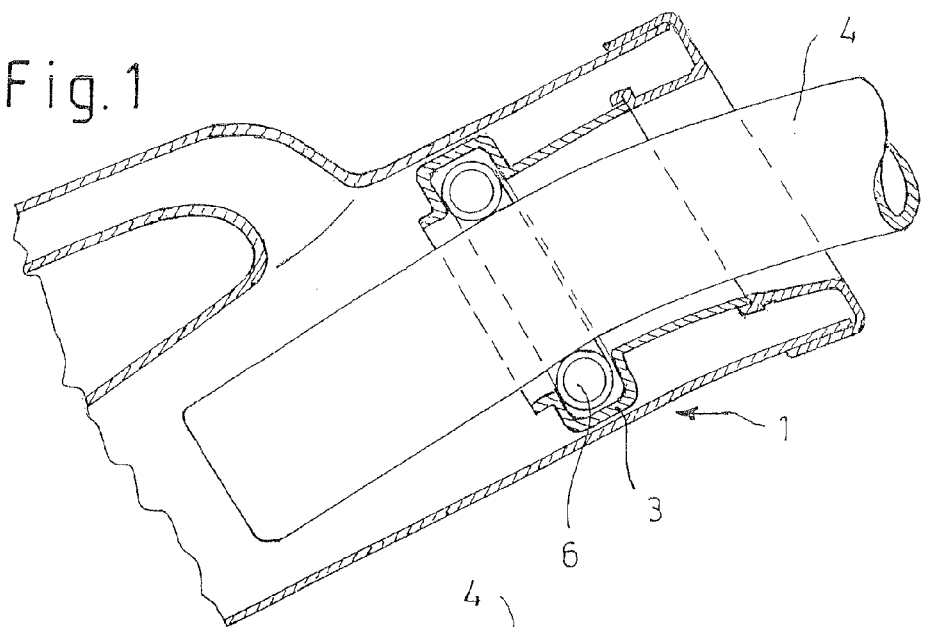

The invention relates to a filler neck for a fuel tank of a motor vehicle which has at least one tubular section provided in the area of the filler inlet to receive the outlet pipe of a fuel delivery nozzle.

Filler necks of the aforementioned type are disclosed by the publications, EP 0 248 673 B1, DE 38 29 948 A1 and DE 195 33 306 C1, for example.

It is fundamentally desirable to seal the filler neck of the fuel tank of a motor vehicle in relation to the outlet pipe of the fuel delivery nozzle when refuelling the motor vehicle. This is intended to prevent any back-surge (spit-back) of the fuel when shutting off the delivery nozzle on reaching the maximum filling level in the fuel tank. In addition, limited angular variations of the outlet pipe of the fuel delivery nozzle must also be possible. For this purpose the publications EP 0 248 673 B1 or DE 38 29 948 A1 disclose the provision of seals of rubber-elastic material, which tightly enclose the inserted outlet pipe of the fuel delivery nozzle. These seals have the disadvantage that they are subject to a certain degree of wear, so that their efficiency deteriorates relatively rapidly.

DE 195 33 306 C1, for example, discloses the provision of an annular seal in the form of a brush seal with bristles directed radially inwards. This brush seal has the advantage that it is relatively independent of tolerances and is also unsusceptible to wear. Any spraying out of fuel when refuelling is reliably prevented. In order to obtain any requisite high degree of gas-tightness, however, a corresponding dense arrangement of the bristles is necessary, thereby making the brush seal relatively expensive and elaborate.

A gas-tight enclosure of the outlet pipe of the fuel delivery nozzle is moreover not always desirable.

Modern fuels containing ethanol, in particular, have a lower vapour pressure than conventional fuels, so that there is a risk, particularly when refuelling with fuels containing ethanol, of inflammable fuel vapour-air mixtures forming in the area of the filler inlet of the motor vehicle and in the expansion volume of the fuel tank. The filler neck of the fuel tank should therefore be designed for sealing in respect of the outlet pipe of the fuel delivery nozzle in such a way that a flashback into the fuel tank is reliably prevented.

The object of the invention, therefore, is to improve a filler neck of the aforementioned type in this respect.

The object is achieved by a filler neck for a fuel tank of a motor vehicle which has at least one tubular section provided in the area of the filler inlet to receive the outlet pipe of a fuel delivery nozzle and which has the distinguishing feature of at least one insert forming a constriction as a flame barrier, which encloses the outlet pipe, forming at least one gas passage gap, the gap dimension being selected so that any flashback is prevented.

The essence of the invention resides in the fact that an insert designed as a flame barrier encloses the outlet pipe of the fuel delivery nozzle when refuelling, so that although a passage of gas might be possible, any flashback is impossible owing to the relatively small dimension of the gap. The working principle here corresponds to that of a fire screen. In its width the gas passage gap is dimensioned so that gas passing through cools to a point at which the flame dies.

In an advantageous variant of the filler neck according to the invention at least one helical ring is provided as an insert, which forms a plurality of gas passage gaps extending in the longitudinal direction of the filler neck.

For the purposes of the invention the term helical ring is taken to mean a closed annular element comprising a circular spiral extending in a circumferential direction. This spiral may be composed of a wire, for example. The helical ring according to the invention may be resilient, for example, and have an inside diameter which is slightly less than the outside diameter of the outlet pipe of the delivery nozzle, so that the individual turns of the spiral are expanded by the introduction of the outlet pipe of the delivery nozzle, forming a corresponding number of gas passage gaps.

In an alternative variant of the filler neck according to the invention the insert has a plurality of circumferentially spaced spring tongues extending in the longitudinal direction of the filler neck, between which gas outlet gaps extending in the longitudinal directional of the filler neck are in each case formed.

In another variant of the filler neck according to the invention the insert may be embodied as a sleeve having the contour of a hyperboloid of one sheet, which has a plurality of gas passage gaps.

The gas passage gaps may extend approximately in the longitudinal direction of the filler neck.

Alternatively the gas passage gaps may extend substantially at an acute angle to the longitudinal axis of the filler neck.

For example, the insert may be formed by a longitudinally slotted sleeve twisted about its longitudinal axis.

Figure 2:
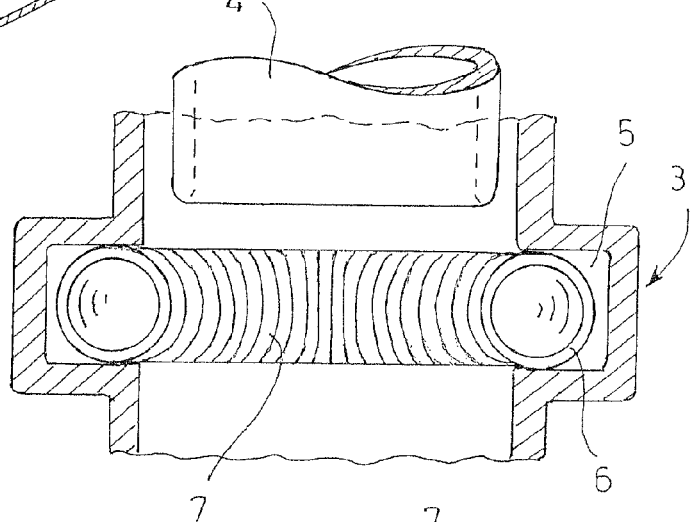
Figure 3:
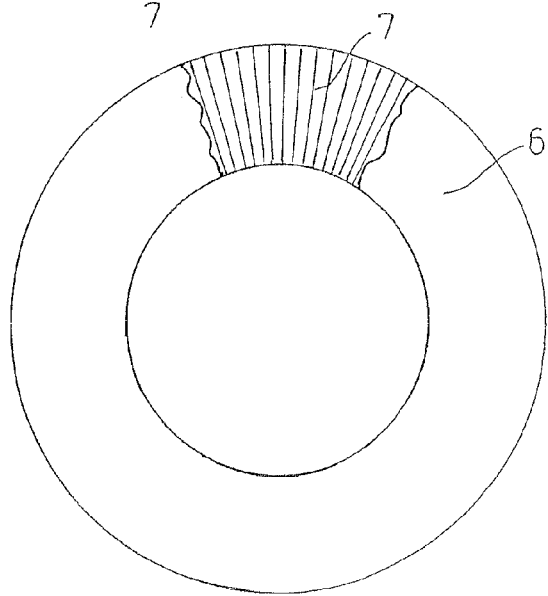
Figure 4:
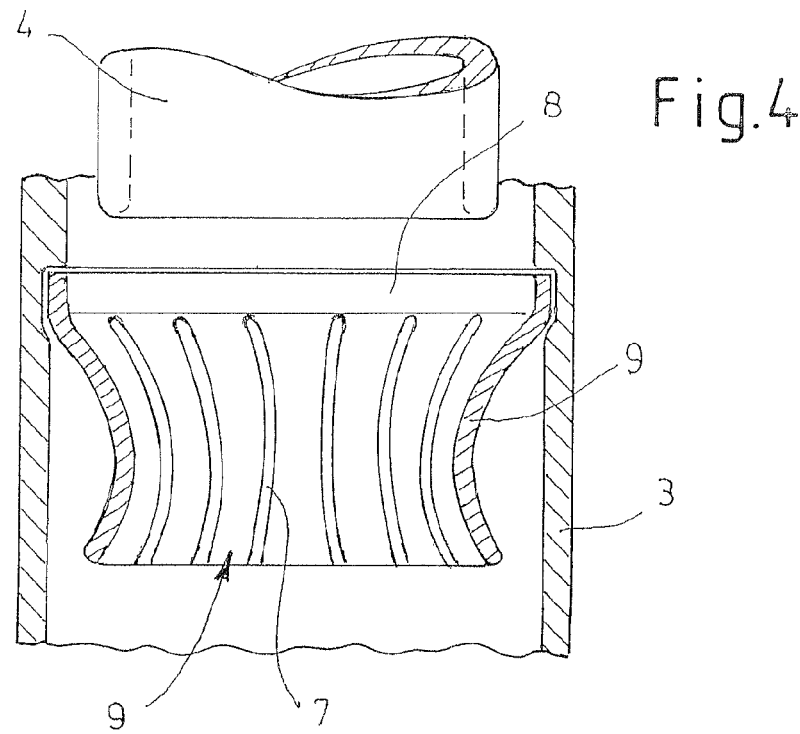
Figure 5:
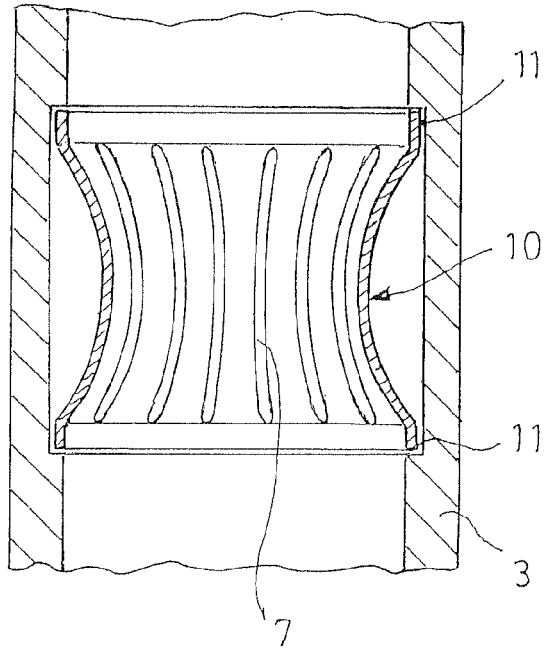
Figure 6:
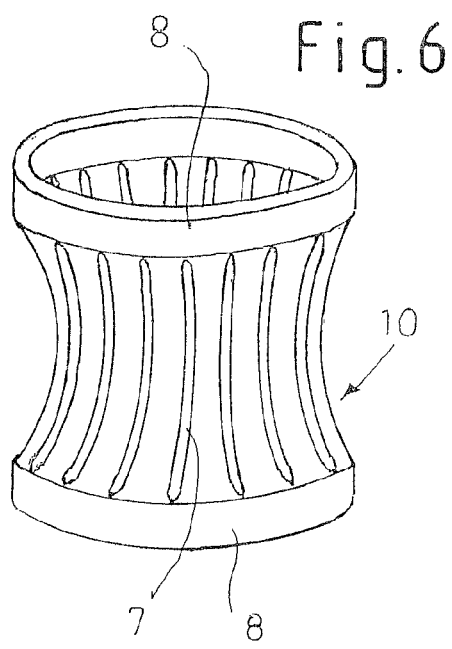
Figure 7:
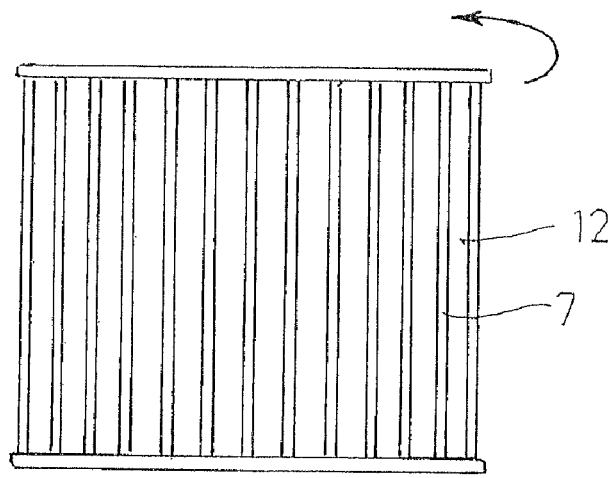
Figure 8:
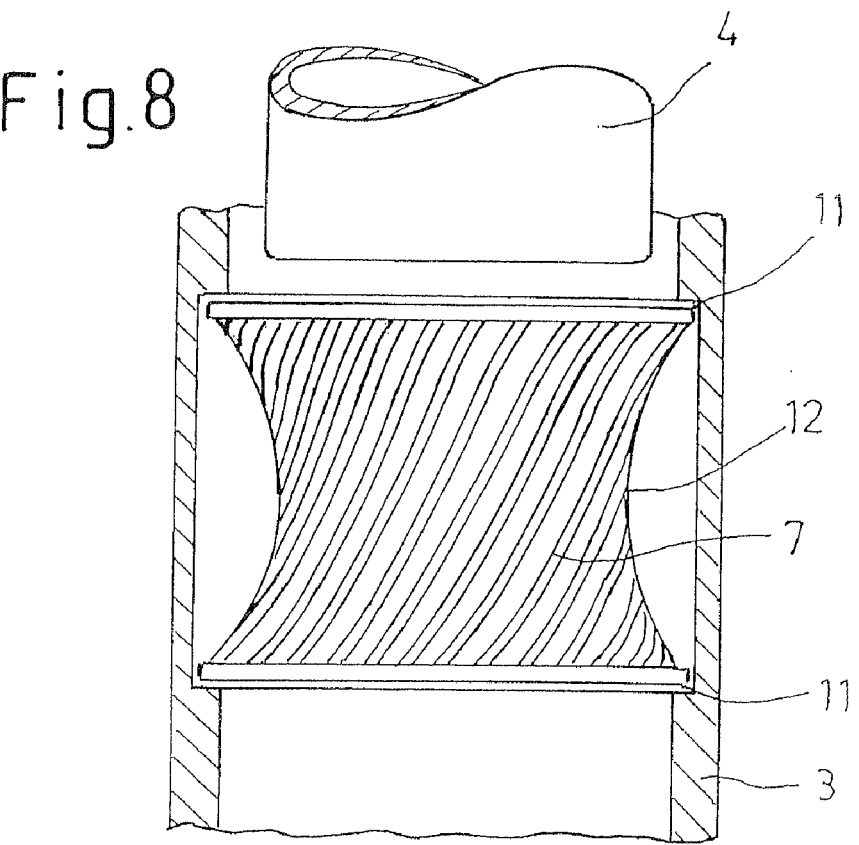

The invention will be explained below with reference to exemplary embodiments represented in the drawings, in which:

FIG. 1 shows a schematic, highly simplified sectional view of the filler neck according to the invention, FIG. 2 shows a sectional view of the tubular section provided in the area of the filler inlet of the filler neck to receive the outlet pipe of a fuel delivery nozzle, FIG. 3 shows a schematic representation of the helical ring according to the invention, FIG. 4 shows a schematic representation of the second exemplary embodiment of the invention, in which the tubular neck accommodates an insert having spring tongues, FIGS. 5 and 6 show a third exemplary embodiment according to the invention, in which the insert is embodied as a sleeve having the contour of a hyperboloid of one sheet and FIGS. 7 and 8 show a fourth exemplary embodiment according to the invention.

Reference will first be made to FIG. 1, in which a filler neck 1 of a plastic fuel tank is represented schematically in the area of its filler inlet 2. In this area the filler neck accommodates a tubular section 3, which has a reduced diameter compared to the filler neck 1 and is designed to receive and enclose an outlet pipe 4 of a fuel delivery nozzle.

Neither the fuel tank nor the fuel delivery nozzle (commonly known as the fuel filler nozzle) is shown, for reasons of simplicity.

As can be seen from the first exemplary embodiment represented in FIGS. 1 to 3, the tubular section 3 is provided with an inwardly open groove 5, which accommodates an insert in the form of a helical ring 6.

The helical ring 6 is embodied as a toroidal element with a wire spiral wound in a circumferential direction. In the unloaded state, the inside diameter of the helical ring 6 is slightly less than the inside diameter of the tubular section 3 and the outside diameter of the outlet pipe 4. When the outlet pipe 4 of the delivery nozzle 1 is introduced into the tubular section 3 and into the helical ring 6, the latter is expanded, so that circumferentially arranged gas passage gaps 7 are created between the individual turns of the helical ring 6, the gap dimension of which is so large that these act as a fire screen to prevent flashback. Any gas passing through the gas passage gaps is cooled due to the relatively small gap width, causing any flame generated to die.

The helical ring 6 is suitably composed of metal, although it is also feasible to produce this from other materials.

FIG. 4 represents an alternative variant of the filler neck 1 according to the invention. For the sake of simplicity, only the tubular section 3 and a part of the outlet pipe 4 are shown. A retaining ring 8 with spring tongues 10 arranged thereon and extending in the longitudinal direction of the filler neck 1 is provided as an insert in the tubular section 3, the spring tongues 10 protruding into the cross section of the tubular section 3 in such a way that the passage cross section is smaller than the outside diameter of the outlet pipe 4. The spring tongues 9 are arranged spaced at a distance from one another over the circumference of the retaining ring 8, so that gas passage gaps 7 are again formed between the spring tongues 9 when the outlet pipe 4 is introduced into the tubular section 3. The spring tongues 9 are curved so that the overall arrangement has the contour of a hyperboloid of one sheet.

The variant of the filler neck 1 according to the invention which is represented in FIGS. 5 and 6 differs from the variant shown in FIG. 4 in that the insert takes the form of a sleeve 10, which likewise has the shape of a hyperboloid of one sheet. The sleeve 10 is clamped between two circumferential steps 11 of the tubular section 3.

Reference will finally be made to the exemplary embodiment of the filler neck according to the invention represented in FIGS. 7 and 8. The insert represented there is embodied as a cylindrical sleeve 10, which has gas passage gaps 7 extending in the direction of the axis of rotation. The sleeve 10 comprises two retaining rings 8, between which spring rods 12 extend. By twisting the retaining rings 8 in opposite directions to one another, the spring rods 12 assume the position drawn in FIG. 8, in such a way that the gas passage gaps 7 extend at an acute angle to the longitudinal axis of the filler neck 1.

LIST OF REFERENCE NUMERALS

1 filler neck
2 plastic fuel tank
3 tubular section
4 outlet pipe
5 groove
6 helical ring
7 gas passage gap
8 retaining ring
9 spring tongues
10 sleeve
11 steps
12 spring rods

What is claimed is:

1. Filler neck for a fuel tank of a motor vehicle which has at least one tubular section provided in an area of a filler inlet to receive an outlet pipe of a fuel delivery nozzle, characterized by at least one insert forming a constriction as a flame barrier, which encloses the outlet pipe, forming at least one gas passage gap, the gap open to a flow of fuel passing through the insert and having a dimension being selected to prevent flashback into the fuel tank; and wherein at least one helical ring is provided as said at least one insert, which forms a plurality of gas passage gaps extending in a longitudinal direction of the filler neck; and wherein said at least one helical ring is a closed annular element comprising a circular spiral extending in a circumferential direction within the tubular section.

2. Filler neck according to claim 1, characterized in that said insert is composed of wire.

3. Filler neck for a fuel tank of a motor vehicle which has at least one tubular section provided in an area of a filler inlet to receive an outlet pipe of a fuel delivery nozzle, characterized by at least one insert forming a constriction as a flame barrier, which encloses the outlet pipe, forming at least one gas passage gap, the gap dimension being selected so that any flashback is prevented, characterized in that the insert is embodied as a sleeve, which is formed with a contour of a hyperboloid of one sheet, which has a plurality of gas passage gaps.

4. Filler neck according to claim 1, characterized in that said helical ring has an inside diameter and said outlet pipe has an outside diameter; and
said inside diameter of said helical ring is smaller than said outside diameter of said outlet pipe.

5. Filler neck according to claim 1, characterized in that said helical ring is expandable by an introduction of said outlet pipe of said delivery nozzle into the tubular section.

6. Filler neck according to claim 1, characterized in that said spiral comprises a plurality of turns which are expandable by an introduction of said outlet pipe of said delivery nozzle into the tubular section.

7. Filler neck according to claim 1, characterized in that said spiral comprises a plurality of turns and said gas passage gaps are located between the turns.

8. Filler neck according to claim 1, characterized in that said helical ring is composed of metal.

9. Filler neck according to claim 3, characterized in that the insert has a plurality of circumferentially spaced spring tongues extending in a longitudinal direction of the filler neck, between which the gas outlet gaps extend in the longitudinal directional of the filler neck.

10. Filler neck according to claim 3, characterized in that the gas passage gaps extend approximately in a longitudinal direction of the filler neck.

11. Filler neck according to claim 3, characterized in that the gas passage gaps extend substantially at an acute angle to a longitudinal axis of the filler neck.

12. Filler neck according to claim 3, characterized in that the insert is formed by a longitudinally slotted cylindrical sleeve twisted about its longitudinal axis.

13. Filler neck according to claim 3, characterized in that the insert is formed from a plurality of rods, which extend between at least two retaining rings arranged at a distance from one another and which in each case form a gas passage gap between them.

14. Filler neck according to claim 13, characterized in that the retaining rings are twisted in opposite directions to one another so that the insert defines an outer shell in a shape of a hyperboloid of one sheet.

* * * * *